US005993067A

United States Patent [19]

Giese et al.

[11] Patent Number: 5,993,067

[45] Date of Patent: Nov. 30, 1999

[54] RELEASE BEARING FOR ACTUATING GEARSHIFT CLUTCH OF AN AUTOMOTIVE VEHICLE

[75] Inventors: Peter Giese, Herzogenaurach; Hartmut Koschmieder, Erlangen; Ralf Bössner, Hersbruck, all of Germany

[73] Assignee: Ina Wälzlager Schaeffler KG, Herzogenaurach, Germany

[21] Appl. No.: 08/898,380

[22] Filed: Jul. 23, 1997

[30] Foreign Application Priority Data

Aug. 2, 1996 [DE] Germany .......................... 196 31 186

[51] Int. Cl.[6] ...................................................... F16C 33/58

[52] U.S. Cl. ............................................ 384/450; 384/516

[58] Field of Search .................................... 384/450, 516, 384/513, 491

[56] References Cited

U.S. PATENT DOCUMENTS

| | | |
|---|---|---|
| 3,370,899 | 2/1968 | Eklund . |
| 4,400,042 | 8/1983 | Fritz . |
| 4,523,863 | 6/1985 | Okoshi . |
| 5,051,004 | 9/1991 | Takeuchi et al. . |

FOREIGN PATENT DOCUMENTS

| | | |
|---|---|---|
| 0 399 855 | 11/1990 | European Pat. Off. . |
| 2 207 875 | 10/1972 | Germany . |
| 26 45 287 A1 | 4/1978 | Germany . |
| 32 06 739 A1 | 10/1982 | Germany . |
| 35 04 251 A1 | 8/1986 | Germany . |
| 44 35 831 A1 | 4/1996 | Germany . |

*Primary Examiner*—Lenard A. Footland

*Attorney, Agent, or Firm*—Akin, Gump, Strauss, Hauer & Feld, L.L.P.

[57] ABSTRACT

A release bearing (1) for actuating a gearshift clutch of an automotive vehicle comprises an angular contact ball bearing (3) in which forces are transmitted from one bearing raceway to another bearing raceway at an angle of pressure $\alpha$ to the transverse plane of the angular contact ball bearing (3). To improve the bearing capacity of such a release bearing (1), the angle of pressure $\alpha$ is configured to be $\geqq 36°$ and $<45°$. Friction between the balls and the raceways of the angular contact ball bearing is reduced by the fact that an osculation $K_{AU}$ on the outer ring (6) is $\geqq 1.15$ and an osculation $K_{IR}$ on the inner ring (10) is $\geqq 1.07$.

3 Claims, 1 Drawing Sheet

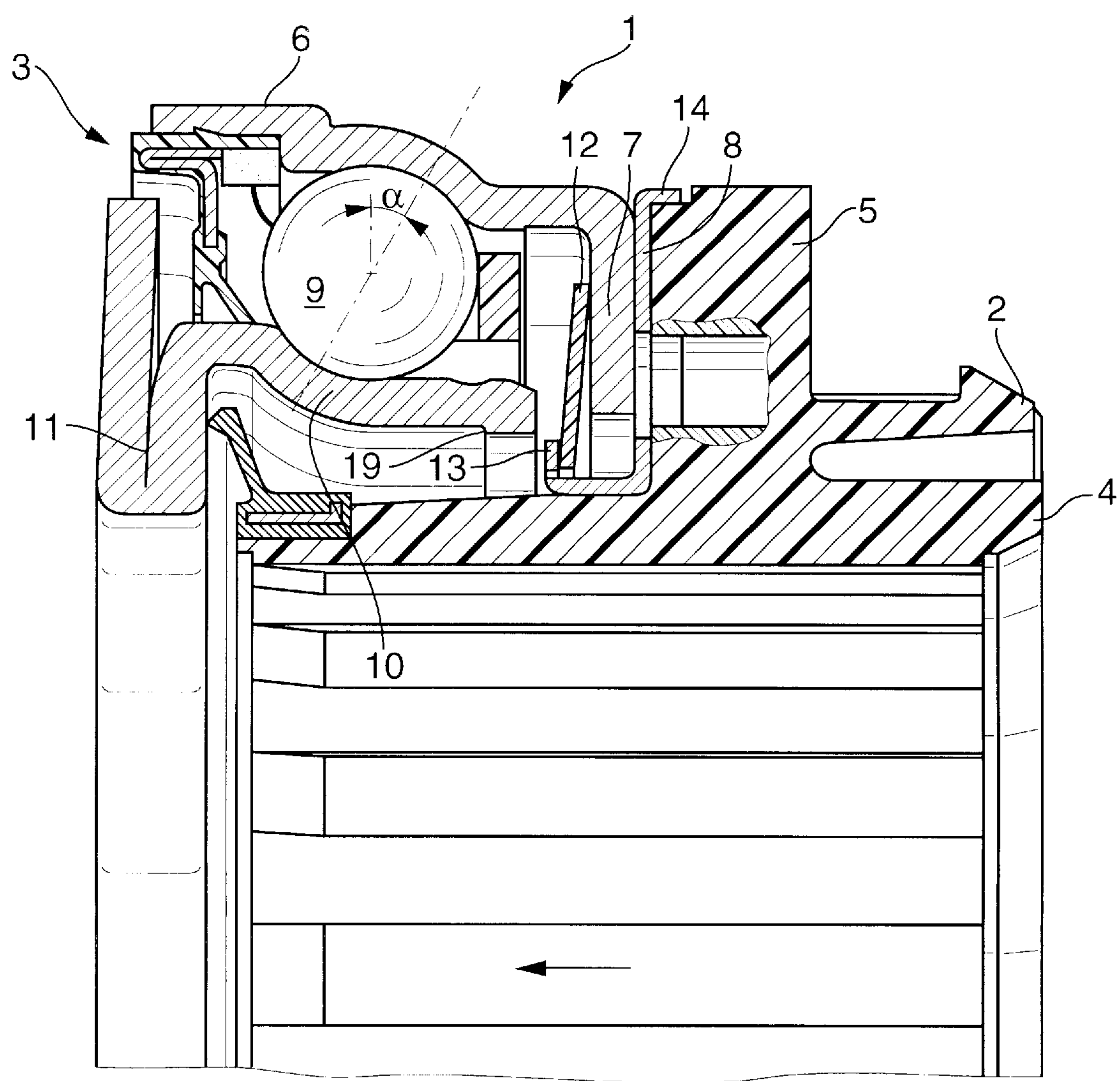
3
6
1
14
12
7
8
5
α
9
2
11
19
13
4
10

RELEASE BEARING FOR ACTUATING GEARSHIFT CLUTCH OF AN AUTOMOTIVE VEHICLE

FIELD OF THE INVENTION

The invention concerns a release bearing for actuating a gearshift clutch of an automotive vehicle comprising an angular contact ball bearing in which forces are transmitted from one bearing raceway to another bearing raceway at an angle of pressure to the transverse plane of the angular contact ball bearing.

BACKGROUND OF THE INVENTION

Release bearings of the above generic type comprise in addition to the angular contact ball bearing, a support bracket on which the angular contact ball bearing is fixed.

SUMMARY OF THE INVENTION

It is an object of the invention to prolong the operating life of such angular contact ball bearings used in release bearings. For achieving this, it is necessary on the one hand to optimize the angle of pressure, and on the other hand, conditions must be created which reduce friction between the balls and the raceways in the angular contact ball bearing.

This and other objects and advantages of the invention will become obvious from the following detailed description.

The invention achieves the above objects by the fact that the angle of pressure $\alpha$ is situated in an optimum range from $\geqq 36°$ to 45°. This angle of pressure, also called angle of contact, is limited by a connecting line extending through the points of contact of the balls with the inner and the outer raceways, and by a transverse plane extending through the ball center. The operating life of the release bearing can be prolonged by the dimensioning of the angle of pressure provided by the invention.

According to another proposition of the invention, the osculation $K_{AU}$ on the outer bearing ring and the osculation $K_{IR}$ on the inner bearing ring are configured so as to considerably reduce friction between the balls and the raceways and thus prolong the life of the release bearing. According to the invention, the osculation $K_{AU}$ on the outer bearing ring which is obtained as a quotient out of the diameter of the balls and a diameter of curvature of the raceway of the outer bearing ring is $\geqq 1.15$ and the osculation $K_{IR}$ on the inner bearing ring is $\geqq 1.07$. The osculation $K_{IR}$ of the inner bearing ring is obtained as a quotient out of the diameter of the balls and a diameter of curvature of the raceway of the inner bearing ring.

The dimensioning of the angle of pressure and the osculations of the inner and outer bearing rings advantageously increase the bearing capacity of the release bearing and reduce wear and friction. Individual advantages can be obtained already by implementing the individual values recited in the independent claims. An optimum design of the release bearing is, however, obtained if all of the recited values are met by the configuration of the angular contact ball bearing.

BRIEF DESCRIPTION OF THE DRAWING

The sole FIGURE shows a semi-section through a release bearing comprising an angular contact ball bearing of the invention.

DETAILED DESCRIPTION OF THE DRAWING

In the sole FIGURE, a release bearing shown in a semi-section is identified at 1. This release bearing 1 comprises a support bracket 2 and an angular contact ball bearing 3 and forms a part of a mechanical or hydraulic device, not shown, of a gearshift clutch assembly arranged between an internal combustion engine and a shift transmission of an automotive vehicle. The support bracket 2 is guided for axial displacement on a primary shaft, not shown in the FIGURE. One end 4 of the support bracket 2 is connected indirectly or directly to a mechanically or hydraulically loadable element. The support bracket 2 comprises an integrally formed annular flange 5 which is offset from the center of the support bracket 2. The angular contact ball bearing 3 is axially supported on the annular flange 5 by an outer bearing ring 6 whose radial arm 7 is bent at right angles and bears with its entire surface against a flanged ring 8 which is inserted between the annular flange 5 and the arm 7. The one-row angular contact ball bearing 3 comprises rolling elements 9 which are in rolling contact with the raceways of the outer and the inner bearing rings 6 and 10. Upon a displacement of the actuating device 1 in the direction of the arrow, an axial force is transmitted via the support bracket 2 and the angular contact ball bearing 3 to a gearshift clutch assembly, not shown, against whose release fingers a radial double-backed portion 11 of the inner ring 10 bears.

With the help of a disc spring 12, the outer bearing ring 6 is force-locked by its arm 7 with the flanged ring 8. The disc spring 12 is supported inwardly on a flange 13 which is arranged axially offset from the longer flange of the flanged ring 8.

The flange 13 is made by bending after the flanged ring 8, the arm 7 and the disc spring 12 have been assembled and engages over the disc spring 12. This integral forming of the flange 13 by bending results in an intended pre-stressed installation of the disc spring 12.

The axial spacing of the two flanges of the flanged ring 8 is larger than the sum of the wall thicknesses of the disc spring 12 and the arm 7. To achieve a positional and rotational fixation of the flanged ring 8, a right-angled edge 14 is provided on the outer periphery of the flanged ring 8 to lock, preferably, partially into appropriate recesses on the annular flange 5.

To influence the basic load rating and wear, the angular contact ball bearing 3 is configured so that an angle of pressure $\alpha \geqq 36°$ is obtained under load. Furthermore, the configuration provides an osculation which is $\geqq 1.15$ on the outer ring and $\geqq 1.07$ on the inner ring.

List of Reference Numbers

1 Release bearing
2 Support bracket
3 Angular contact ball bearing
4 End
5 Annular flange
6 Outer bearing ring
7 Arm
8 Flanged ring
9 Rolling element
10 Inner bearing ring
11 Radial portion
12 Disc spring
13 Flange
14 Bent edge
$\alpha$ Pressure angle

What we claim is:

1. A release bearing (1) for actuating a gearshift clutch of an automotive vehicle comprising an angular contact ball bearing (3) having inner and outer bearing raceways with a plurality of rolling elements (9) located therebetween, with means to increase wear life including the outer bearing raceway being located in an outer bearing ring (6) and having a diameter of curvature $D_{AL}$, the rolling elements being in the form of balls having a diameter $D_W$, the bearing (3) being adapted for transmission of forces from one of the inner and outer bearing raceways to the other of the inner and outer bearing raceways at an angle of pressure to a transverse plane of the angular contact ball bearing (3), wherein an osculation $K_{AU}$ on the outer bearing ring (6) obtained as a quotient of the diameter of curvature $D_{AL}$ of the outer bearing raceway and the diameter $D_W$ of the rolling elements is ≧1.15 so that $$K_{AU} = \frac{D_{AL}}{D_W} \geq 1.15.$$

2. A release bearing (1) for actuating a gearshift clutch of an automotive vehicle comprising an angular contact ball bearing (3) having inner and outer bearing raceways with a plurality of rolling elements (9) located therebetween, with means to increase wear life including the inner bearing raceway being located in an inner bearing ring (10) and having a diameter of curvature $D_{IL}$, the rolling elements being in the form of balls having a diameter $D_W$, the bearing (3) being adapted for transmission of forces from one of the inner and outer bearing raceways to the other of the inner and outer bearing raceways at an angle of pressure to a transverse plane of the angular contact ball bearing (3), wherein an osculation $K_{IR}$ on the inner bearing ring (10) obtained as a quotient of the diameter of curvature $D_{IL}$ of the inner bearing raceway and the diameter $D_W$ of the rolling elements is ≧1.07 so that $$K_{IR} = \frac{D_{IL}}{D_W} \geq 1.07.$$

3. A release bearing (1) for actuating a gearshift clutch of an automotive vehicle comprising an angular contact ball bearing (3) having an inner bearing raceway located in an inner bearing ring (10) and an outer bearing raceway located in an outer (6) bearing rings, with a plurality of rolling elements (9) located therebetween, with means to improve wear life including the rolling elements being in the form of balls, the bearing (3) being adapted for transmission of forces from one bearing raceway to another bearing raceway at an angle of pressure $\alpha$ to a transverse plane of the angular contact ball bearing (3), wherein the angle of pressure $\alpha$ is ≧36° and <45°, an osculation $K_{IR}$ of an inner bearing ring is ≧1.07 and an osculation $K_{AU}$ of an outer bearing ring (6) is ≧1.15.

* * * * *